No. 788,374. PATENTED APR. 25, 1905.
J. R. PORTER & M. COLE.
FILTER.
APPLICATION FILED JUNE 28, 1901.
2 SHEETS—SHEET 1.
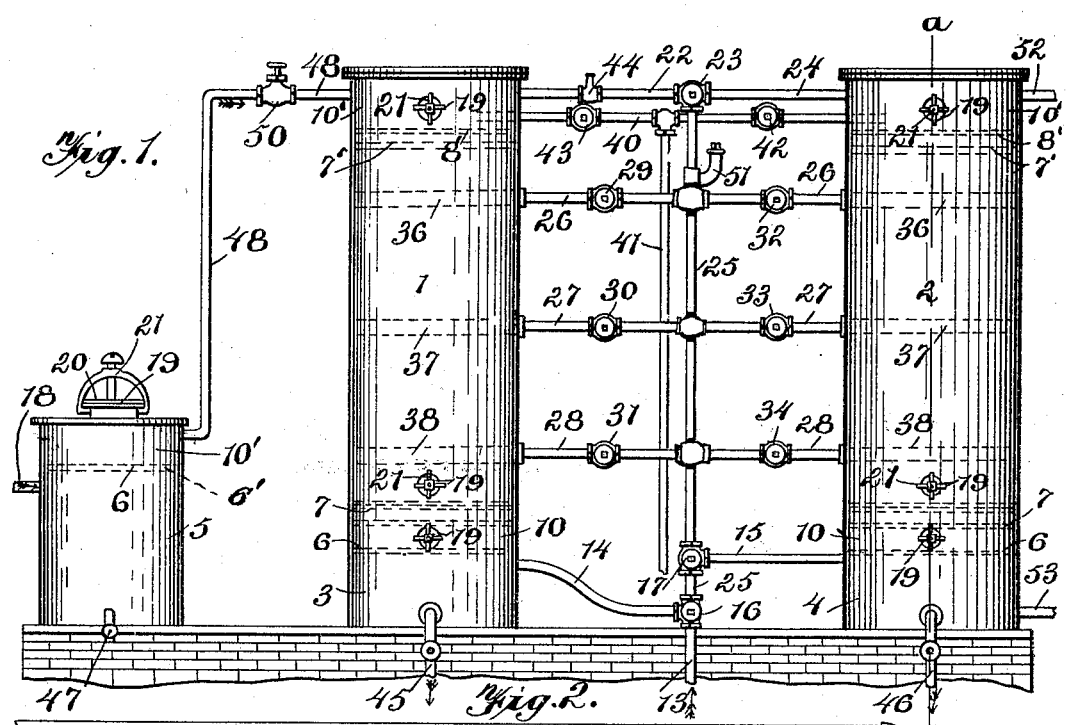
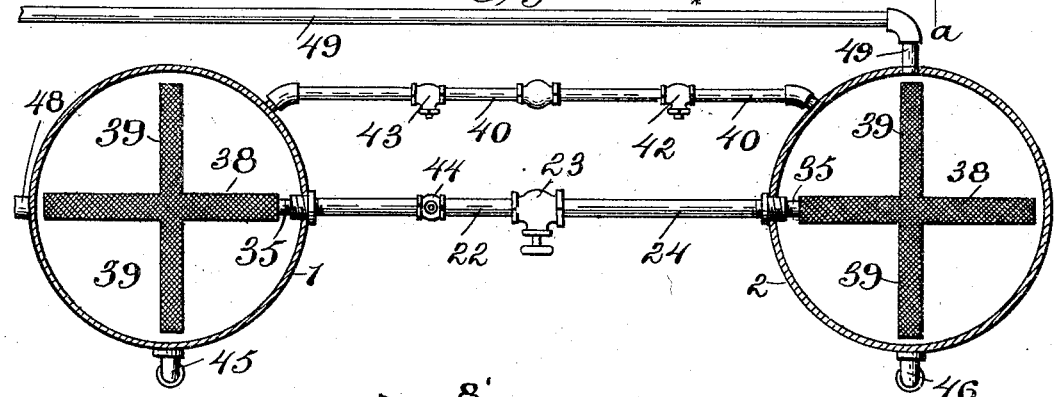
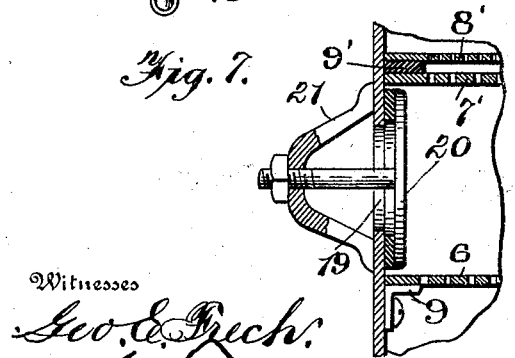
Witnesses
Geo. E. Frech.
S. A. Terry
Inventors
James R. Porter
Marietta Cole
By S. H. Evans
Attorney No. 788,374. PATENTED APR. 25, 1905.
J. R. PORTER & M. COLE.
FILTER.
APPLICATION FILED JUNE 28, 1901.
2 SHEETS—SHEET 2.
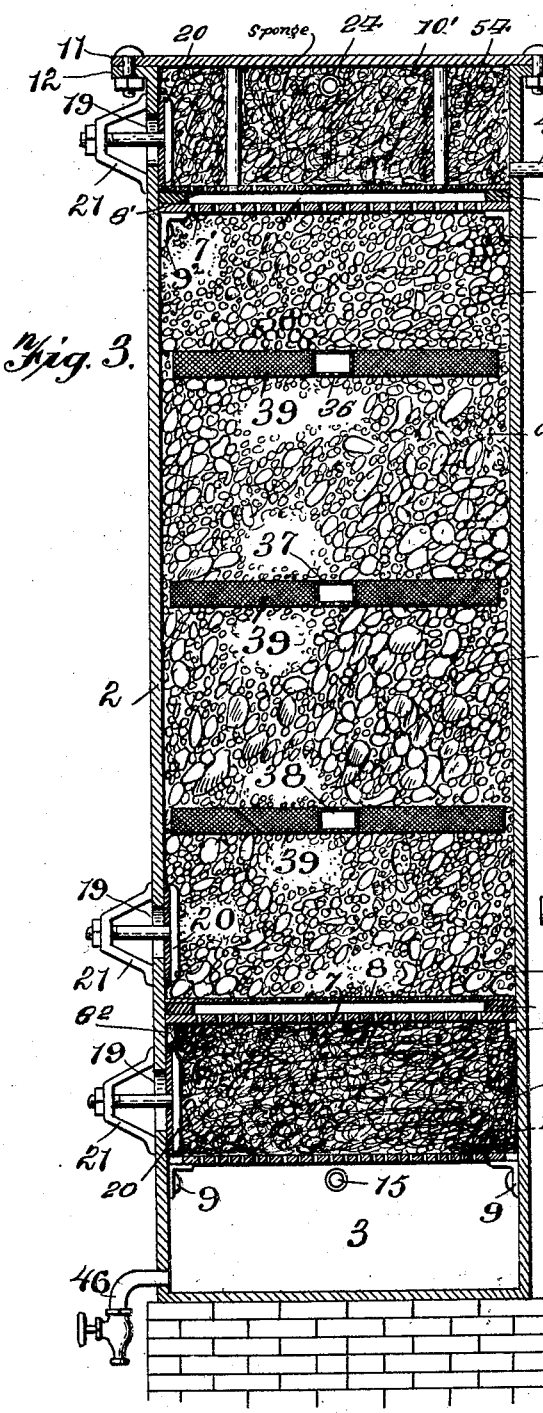
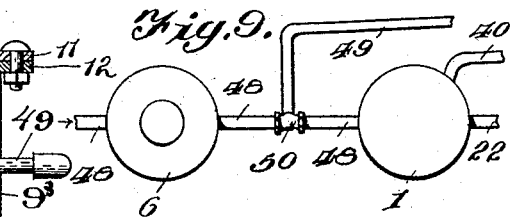
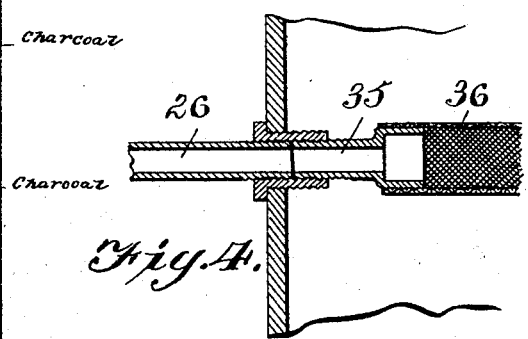
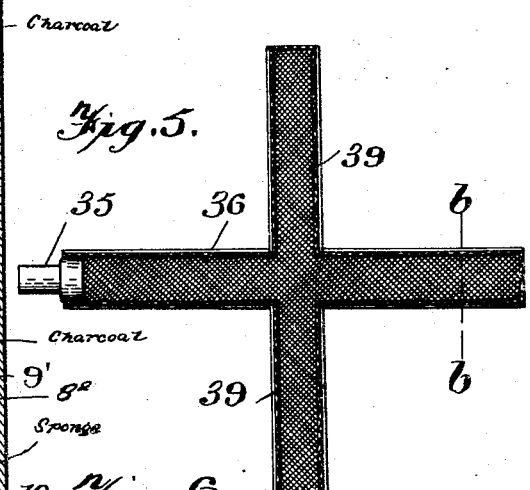
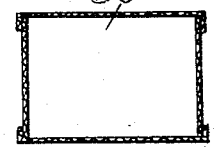
Witnesses
Inventors
James R. Porter
and
Marcellus Cole
By S. N. Evans Attorney No. 788,374. Patented April 25, 1905.

UNITED STATES PATENT OFFICE.

JAMES R. PORTER AND MARCELLUS COLE, OF WASHINGTON, DISTRICT OF COLUMBIA; SAID COLE ASSIGNOR TO SAID PORTER.

FILTER.

SPECIFICATION forming part of Letters Patent No. 788,374, dated April 25, 1905.

Application filed June 28, 1901. Serial No. 66,408.

*To all whom it may concern:*

Be it known that we, JAMES R. PORTER and MARCELLUS COLE, citizens of the United States, residing at Washington, in the District of Columbia, have invented certain new and useful Improvements in Filters, of which the following is a specification.

Our present invention relates to improvements on the inventions described in Patents No. 440,239, dated November 11, 1890, and No. 654,783, dated July 31, 1900, and is adapted to filter the supply of water for dwellings, large buildings, or the entire supply for cities.

One object of our invention is to provide a filter consisting of two vertical parallel cylinders. In the upper and lower portion of each cylinder we provide compartments for the reception of sponges, which we find very effective in removing foreign matter from the water.

A further object of our invention is to provide in the lower end of each cylinder a compartment constituting a receiving and settling chamber, also an auxiliary settling-chamber which is provided with a sponge-compartment. These settling-chambers serve to collect a large portion of the heavy matter suspended in the water, thus relieving the filters of a considerable amount of work.

A further object is to provide means whereby the water can be taken from the source of supply into the bottom of the primary filtering-chamber, passed through the settling-chamber therein, then upward through the primary cylinder, conveyed to the lower portion of the secondary or final filtering chamber, upward through the same, and to the point of consumption or through the auxiliary settling-chamber to the top of the primary filtering-chamber downward, then passed through the final or secondary chamber, from the top or bottom, as may desired.

A further object of our invention is to so construct the water-communications with each of the filtering-cylinders that they can be cleaned either simultaneously or separately by introducing the water from the main through the top or bottom of the cylinders or through a series of clean-out strainers extending transversely through the cylinders, and by means of their controlling-valves the pressure can be concentrated and alternated against small sections of the filtering material in a manner which will thoroughly and rapidly cleanse the same. The chambers can also be alternately cleaned by water which has been previously filtered.

Our invention consists in the construction and combination of parts, as will be fully described hereinafter and particularly pointed out in the claims.

In the accompanying drawings, Figure 1 is an elevation of our invention, the clean-out strainers and sieves being indicated by dotted lines. Fig. 2 is a sectional plan view of the filtering-chambers. Fig. 3 is a vertical sectional view of the final filtering-chamber on the line $a\ a$ of Fig. 1. Fig. 4 is an enlarged sectional view of a portion of one of the clean-out strainers. Fig. 5 is a plan view of one of the clean-out strainers. Fig. 6 is a sectional view of an arm of the clean-out strainer on the line $b\ b$ of Fig. 5; Fig. 7, an enlarged sectional view of the hand-hole and covering-plate. Fig. 8 is a sectional view of one of the three-way valves. Fig. 9 is a top plan view of the auxiliary receiving-chamber and No. 1 filtering-chamber.

Referring now to the drawings, the numerals 1 and 2 indicate two vertically-arranged filtering-chambers, which are preferably supported on a brick or cement foundation. In the lower portion of each cylinder we place a perforated galvanized cast-iron disk 6, which is supported on lugs or shoulders 9, thus forming supply and settling chambers 3 and 4 within each cylinder in a simple and economical manner.

7 indicates a perforated galvanized cast-iron disk, which is supported by shoulders $8^2$, and 8 a perforated brass disk. Between the disks 7 and 8 is a rubber gasket 9'. The disks 6 and 7 form interior chambers 10, in which we place sponges or like material. In the upper portion of the cylinders 1 and 2 we form similar sponge boxes or chambers 10' by providing lugs or shoulders $9^2$, upon which rests a perforated galvanized disk 7' and a perforated brass disk 8' with a gasket 9³ between them. The top of the cylinders are closed with a plate having a flange connection 11 and 12 with the cylinders.

5 indicates an auxiliary receiving and settling chamber, in the upper portion of which we provide lugs or shoulders upon which we place a perforated galvanized disk 6', thus forming a sponge box or receptacle 10'.

13 is a pipe connected with the water-main, and extending from this pipe is a pipe 14, which is connected with the upper end of the combined supply and settling chamber 3, situated in the lower portion of the primary filtering-chamber 1. The laterally-extending pipe 15, which is situated above the pipe 14, is in communication with the upper end of the settling-chamber 4. Where the pipes 14 and 15 connect with the pipe 13, we provide three-way valves 16 and 17, by means of which the flow of the water may be conveniently directed in any desired direction. A supply-pipe 18 serves to connect the main with the upper end of the auxiliary settling-chamber 5.

The cylinders 1 and 2 and the auxiliary receiver 5 are provided with hand holes or openings 19 into the sponge-receptacles 10 and 10' in order that the sponges may be cleaned or renewed. The openings are provided with closing-plates 20, having a laterally-extending screw-threaded pin, which is secured by means of an ordinary claw 21, as clearly illustrated. A similar opening is provided in each cylinder just above the lower sieves 7 and 8 for the purpose of withdrawing the filtering material.

The upper ends of the filtering-chambers are connected by the laterally-extending pipes 22 and 24, which are connected by the three-way valve 23, and depending from the valve 23 is a pipe 25, which is connected with the pipes 13, 14, and 15 through the valves 16 and 17.

Connected with the depending pipe 25 are laterally-extending pipes 26, 27, and 28, which are provided with controlling-valves 29, 30, 31, 32, 33, and 34. The outer ends of the pipes 26, 27, and 28 are connected with clean-out strainers 36, 37, and 38 through reducing-fittings 35, as shown in Fig. 4.

The clean-out strainers, as illustrated in Figs. 5 and 6, are constructed of a heavy brass gauze or perforated plates. The perforations are so minute as to prevent the filtering material from passing through them. The edges of the upper and lower plate are turned to form a flange to receive the sides plates, the joints of which are soldered. The strainers are rectangular, with two laterally-extending arms 39, and extend transverse the filtering-chambers, the ends of the strainers being closed, as clearly illustrated.

A waste-pipe 40 serves to connect the upper sponge-boxes 10' and is provided with controlling-valves 42 and 43.

We provide an air-vent or petcock 44 to be used when it is desired to draw the water off for any purpose.

Extending from the settling-chambers 3, 4, and 5 are waste-pipes 45, 46, and 47, which are provided with valves or plugs.

The pipe 48 serves to connect the auxiliary receiving and settling chamber 5 with the upper end of the primary filtering-chamber 1, the flow of water being controlled by a three-way valve 50, which is situated on the pipe 48 adjacent the upper end of the primary filtering-chamber 1. Extending from the three-way valve 50 is a pipe 49, its opposite end being connected with the upper end of the filtering-chamber 2. The pipes 48 and 49 thus serve to connect the auxiliary receiving and settling chamber 5 with the upper end of the filtering-chamber 2, the flow of water being controlled by the three-way valve 50. The pipe 51 is to form a connection with steam or hot water which may be introduced during the process of cleaning for the purpose of destroying germs.

The primary filtering-chamber 1 is packed with manganese, and the secondary or final filtering-chamber 2 is packed with animal-bone charcoal.

In operating the filter the valves on the clean-out pipes 26, 27, and 28 and on all waste-pipes are closed, the auxiliary receiving-chamber being cut off, the valve 16 is turned to permit the supply from pipe 13 to pass through pipe 14 into the top of settling-chamber 3, where the heavy matter held in suspension settles to the bottom of the chamber. The water then passes upward through the several compartments of the primary filter 1, the blank of valve 50 being turned against the primary filter 1 and the blank of valve 23 against pipe 25, and the water will pass into the top of cylinder 2, down through the compartment of the final filtering-chamber and to the point of consumption through outlet 53, 52 being closed, or the valve 23 can be turned to convey the water through pipes 25 and 15 up through chamber 2 and to the outlet 52, in which case outlet 53 should be closed. When the water is brought from the main through the auxiliary receiver 5, the blank of valve 16 is turned against pipe 13 and valve 50 turned to permit the water to pass directly to the top of chamber 2, down through the same to the outlet 53, or, on the other hand, it may pass into the top of chamber 1 downward through the compartments of the same, through pipes 14 and 15, then up through chamber 2 to outlet 52 or through pipes 14, 25, and 24 to the top of chamber 2 and down through the same to outlet 53.

Through the manipulation of the valves, as above explained, it will be seen that we provide simple means by which the water can be passed through three receivers, five sponge-compartments, the area of each being equal to that of the respective cylinders, a series of sieves, all of which greatly relieve the work to be done by the filtering material. The water can be passed through either of the filtering-chambers from the top or bottom, and in this connection we have found that by introducing the water into the top of the cylinders the material is made more compact, after which the flanged top can be removed and additional material put in, when the water can be passed upward through either or both of the chambers.

It will be noticed that the inlets and outlets to the settling-chambers 3, 4, and 5 for the filtered water are all in the extreme top of the chambers to prevent the water from agitating the sediment which has previously settled therein.

To clean the cylinder 1, the water is first passed upward through cylinder 2 and filtered, the outlets 52 and 53 being closed and the valve 43, controlling the top of the waste, opened and the water conveyed to pipe 25. By alternatingly and successively opening and closing valves 29, 30, and 31 the pressure is rapidly concentrated and alternated against the sections of the filtering material between the clean-out strainers and the ends of the respective cylinders, thus thoroughly washing every portion of the material. To clean cylinder 2, the water is first passed through cylinder 1, and the same process followed through the manipulation of valves 32, 33, and 34. The waste-pipes 45 and 46 should be opened a portion of the time when cleaning. Either chamber may be cleaned in the same manner with water from the auxiliary receiving and settling chamber 5, the communicating pipes and valves being operated, as above explained, so as to clean the chamber with water directly from chamber 5 or by cleaning each chamber with water which has been previously filtered by the other chamber. After thus cleaning the supply-pipes 13 and 18 should be cut off and hot water or steam introduced through pipe 51. It will be readily seen that the connecting-pipes and their controlling-valves will admit the steam or hot water to every portion of the apparatus, thus destroying all germ matter. The waste-pipes should be partly opened while the steam is admitted. After the steam is cut off the filter and receivers should be again washed, as above explained.

The tops of the filtering-chambers are provided with two or more depending pipes 54 for the purpose of holding the sieves 8 against the upward pressure of the water.

Having thus described our invention, what we claim, and desire to secure by Letters Patent, is—

1. In a filtering apparatus comprising the auxiliary settling-chamber, connecting-pipes 48 and 49, the primary and final filtering-chambers, settling-chambers 3 and 4, perforated disks 6, 7 and 8, means for supporting the said disks, the sponge-receptacles 10 and 10', at each end of the filtering-chambers and of a diameter equal to that of the respective chambers, pipes 13 and 14 connecting the main with the top of the settling-chamber 3, pipes 22, 24, 25 and 15, three-way valves 16, 17 and 23, arranged to place chamber 1 in communication with the top or bottom of chamber 2, and outlet-pipes 52 and 53, substantially as described.

2. In a filter, the combination of the primary and final filtering-chambers, sponge-compartments within said filtering-chambers, pipes and controlling-valves forming communications from the main to the bottom of said filters, through receivers 3 and 4 and sponge-receptacles 10, or to the top of the said filters through sponge-receptacle 10', pipe 18 having communication with the water-main and with the upper portion of the auxiliary settling-chamber 5, pipes 48 and 49 connecting with sponge-compartments of the chamber 5 and the upper filtering-chambers 1 and 2 through sponge-receptacle 10', operating-valve 50 and inlets 52 and 53, substantially as described.

3. In a filter, comprising primary and final filtering-chambers, an auxiliary settling-chamber 5, a sponge-receptacle 10' carried thereby and in communication therewith, sponge-receptacles 10 carried by filtering-chambers, a pipe 25 communicating with the water-main and the sponge-receptacles, transversely-extending rectangular clean-out strainers 36, 37 and 38 carried by the filtering-chambers, laterally-extended pipes 26, 27 and 28, in communication with pipe 25 and said strainers, operating-valves 29, 30, 31, 32, 33 and 34 adapted to direct the pressure through small sections of the material from one chamber to the other, waste-pipes 45 and 46 at the lower ends of the filtering-chamber, and waste-pipes 40 and 41 with valves 42 and 43 leading from the top of the filtering-chambers, substantially as described.

4. A filtering apparatus comprising primary and final filtering-chambers, an auxiliary settling-chamber and sponge-receptacles in communication with the upper ends of the primary and final filtering-chambers, waste-pipes 40, 41 extending from the upper ends of the filtering-chambers, valves 42 and 43 carried thereby, said chambers having openings, covers 20 and 21 closing said openings, a pipe 25 having communication with the water-main, strainers 36, 37 and 38 carried by the filters, a steam connection 51, pipes 14, 15, 22, 24, 26, 27 and 28 having communication with said steam connection and said strainers, valves 16, 17, 25, 29, 30, 31, 32, 33 and 34 by said pipes, a pipe 48 communicating with said steam connection and the auxiliary chamber, and valve 49 controlling said pipe 48, substantially as described.

5. In a filter the combination with filtering-chambers 1 and 2, auxiliary settling-chamber 5, having compartments separated by disks 6, 7 and 8, settling-chambers 3 and 4, sponge-receptacles 10 and 10', supply-pipes 13 and 18 communicating with the water-main, connecting-pipes 14, 15, 22, 24 and 25, operating-valves 16, 17 and 23 carried thereby for controlling the passage of water between the chambers 1 and 2, pipes 48, and 49 with operating-valve 50 for controlling the passage of water between the auxiliary chamber 5 and chambers 1 and 2, steam connection 51, a series of rectangular clean-out strainers having laterally-extending arms carried by the chambers 1 and 2, pipes 26, 27 and 28 with controlling-valves 29, 30, 31, 32, 33, and 34 in communication with pipe 25 waste-pipes 40, 41, 45, 46 and 47, and outlet-pipes 52 and 53, substantially as described.

In testimony whereof we affix our signatures in presence of two witnesses.

JAMES R. PORTER.
MARCELLUS COLE.

Witnesses:
S. A. TERRY,
SAMUEL H. EVANS.